United States Patent
Wu

(10) Patent No.: US 12,082,126 B2
(45) Date of Patent: Sep. 3, 2024

(54) POWER CONTROL METHOD, TERMINAL, AND NETWORK SIDE DEVICE

(71) Applicant: VIVO MOBILE COMMUNICATION CO., LTD., Dongguan (CN)

(72) Inventor: Yumin Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 117 days.

(21) Appl. No.: 17/152,757

(22) Filed: Jan. 19, 2021

(65) Prior Publication Data

US 2021/0144656 A1    May 13, 2021

Related U.S. Application Data

(63) Continuation of application No. PCT/CN2019/097694, filed on Jul. 25, 2019.

(30) Foreign Application Priority Data

Jul. 26, 2018  (CN) .......................... 201810837084.2

(51) Int. Cl.
H04W 52/48       (2009.01)
H04W 52/54       (2009.01)
H04W 74/08       (2009.01)
H04W 74/0833     (2024.01)

(52) U.S. Cl.
CPC .......... *H04W 52/48* (2013.01); *H04W 52/54* (2013.01); *H04W 74/0833* (2013.01)

(58) Field of Classification Search
CPC ...... H04L 1/06; H04W 52/362; H04W 52/48; H04W 52/50; H04W 52/54; H04W 74/0833
See application file for complete search history.

(56) References Cited

U.S. PATENT DOCUMENTS

| | | | | |
|---|---|---|---|---|
| 2016/0353440 A1* | 12/2016 | Lee | ............ | H04W 72/0453 |
| 2017/0019930 A1* | 1/2017 | Lee | ............ | H04W 72/21 |
| 2021/0274568 A1* | 9/2021 | Sengupta | ............ | H04L 5/0051 |

FOREIGN PATENT DOCUMENTS

| | | |
|---|---|---|
| CN | 102111866 A | 6/2011 |
| CN | 102918895 A | 2/2013 |
| CN | 102958045 A | 3/2013 |
| CN | 106413069 A | 2/2017 |
| CN | 108235392 A | 6/2018 |
| CN | 108282276 A | 7/2018 |
| WO | 2017193376 A1 | 11/2017 |

OTHER PUBLICATIONS

International Search Report issued in corresponding International Application No. PCT/CN2019/097694, dated Oct. 24, 2019, 4 pages.

(Continued)

*Primary Examiner* — Nizam U Ahmed
(74) *Attorney, Agent, or Firm* — IPX PLLC

(57) ABSTRACT

Embodiments of the present disclosure provide a power control method, a terminal, and a network side device thereof. The power control method may be applied to a terminal, and include obtaining a power control parameter, and controlling retransmission power of a data section in a message of a random access procedure based on the power control parameter.

13 Claims, 4 Drawing Sheets

(56) References Cited

OTHER PUBLICATIONS

Catt, "dated power control and power ramping procedure in multi-beam configuration", 3GPP TSG RAN WG1 RAN1#90, R1-1712358, Aug. 25, 2017.
Search Report issued in related Chinese Application No. 201810837084.2, dated Aug. 6, 2020, 9 pages.
Second Office Action issued in related Chinese Application No. 201810837084.2, dated Nov. 26, 2020, 11 pages.
ZTE Corporation, ZTE Microelectronic, "On 2-step RACH procedure in NR", 3GPP, R1-1611274, Nov. 18, 2016.

* cited by examiner

POWER CONTROL METHOD, TERMINAL, AND NETWORK SIDE DEVICE

CROSS-REFERENCE TO RELATED APPLICATIONS

This application is a bypass continuation of PCT Application No. PCT/CN2019/097694 filed Jul. 25, 2019, which claims priority to Chinese Patent Application No. 201810837084.2, filed in China on Jul. 26, 2018, both of which are incorporated herein by reference in their entireties.

TECHNICAL FIELD

Embodiments of the present disclosure relate to the field of communications technologies, and in particular to, a power control method, a terminal, and a network side device.

BACKGROUND

A network side device transmits, to a terminal through a PDCCH (Physical Downlink Control Channel), a TPC (Transmit Power Control) command including power control information, so that the terminal controls data retransmission power based on the power control information included in the TPC command.

In related technologies, if the terminal wants to obtain the TPC command, the PDCCH needs to be decoded, and decoding the PDCCH requires a C-RNTI (Cell-Radio Network Temporary Identifier) of the terminal for descrambling.

However, for a terminal that has not succeeded in random access, the network side device has not allocated a C-RNTI. Therefore, the terminal cannot obtain the TPC command delivered by the network side device through the PDCCH, and thus cannot increase the retransmission power of the data, resulting in a relatively low retransmission success rate of the data.

SUMMARY

An embodiment of the present disclosure provides a power control method, a terminal, and a network side device to resolve problems in related technologies that a terminal that has not succeeded in random access cannot obtain a TPC command delivered by a network side device through a PDCCH, thereby failing to increase retransmission power of data, resulting in a relatively low retransmission success rate of the data.

To resolve the foregoing problems, the present disclosure is implemented as follows:

According to a first aspect, an embodiment of the present disclosure provides a power control method, applied to a terminal, where the method includes: obtaining a power control parameter; and controlling retransmission power of a data section in message 1 of a random access procedure based on the power control parameter.

According to a second aspect, an embodiment of the present disclosure further provides a power control method, applied to a network side device, where the method includes: sending a power control parameter to a terminal, where the power control parameter is used to control retransmission power of a data section in message 1 of a random access procedure.

According to a third aspect, an embodiment of the present disclosure further provides a terminal, including: an obtaining module, configured to obtain a power control parameter; and a control module, configured to control retransmission power of a data section in message 1 of a random access procedure based on the power control parameter.

According to a fourth aspect, an embodiment of the present disclosure further provides a network side device, including: a transmitting module, configured to send a power control parameter to a terminal, where the power control parameter is used to control retransmission power of a data section in message 1 of a random access procedure.

According to a fifth aspect, an embodiment of the present disclosure further provides a terminal, including a processor, a memory, and a computer program stored in the memory and executable on the processor, where the computer program, when executed by the processor, implements the steps of the power control method.

According to a sixth aspect, an embodiment of the present disclosure further provides a computer readable storage medium, where the computer readable storage medium stores a computer program, and the computer program, when executed by a processor, implements the steps of the foregoing power control method.

In the embodiments of the present disclosure, the power control parameter is obtained, and the retransmission power of the data section in the message 1 of the random access procedure is controlled based on the power control parameter. It can be learned that when retransmitting the data section in the message 1, the terminal can adjust the retransmission power based on the obtained power control parameter, thereby improving a retransmission success rate of the data section in the message 1.

BRIEF DESCRIPTION OF DRAWINGS

To describe the technical solutions in the embodiments of the present disclosure more clearly, the following briefly describes the accompanying drawings required in the embodiments of the present disclosure. Apparently, the accompanying drawings in the following descriptions show merely some embodiments of the present disclosure, and a person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of this application without creative efforts shall fall within the protection scope of this application.

Terms such as "first" and "second" in this application are used to distinguish between similar objects, instead of describing a specific sequence or order. In addition, the terms "comprise" and "include", and any variants thereof are intended to cover non-exclusive inclusion. For example, a process, a method, a system, a product, or a device that includes a series of steps or units is not necessarily limited to those steps or units listed expressly, but instead may include other steps or units not expressly listed or inherent to the process, the method, the product, or the device. In addition, "and/or" used in this application means at least one of the connected objects. For example, A and/or B and/or C represents the following seven cases: Only A exists, only B exists, only C exists, both A and B exist, both B and C exist, both A and C exist, or A, B, and C all exist.

Figure 1:
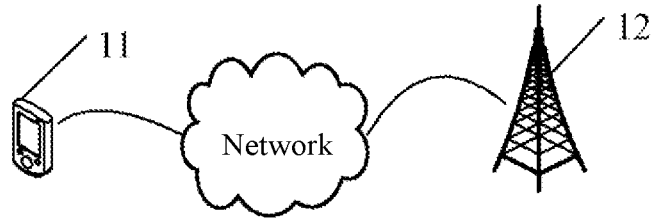
FIG. 1 is a structural diagram of a network system to which an embodiment of the present disclosure may be applied.

Referring to FIG. 1, FIG. 1 is a structural diagram of a network system to which an embodiment of the present disclosure is applicable. As shown in FIG. 1, the network system includes a terminal 11 and a network side device 12. The terminal 11 and the network side device 12 may communicate with each other through a network.

In this embodiment of the present disclosure, the terminal 11 may be also referred to as UE (User Equipment). In actual implementation, the terminal 11 may be a terminal-side device such as a mobile phone, a tablet, a laptop, a personal digital assistant (PDA), a mobile internet device (MID), a wearable device, or a vehicle-mounted device. It should be noted that a specific type of the terminal 11 is not limited in the embodiments of the present disclosure. The network side device 12 may be a base station of 5G or a later release (for example, a 5G NR NB), or a base station in another communications system (for example, an eNB (Evolutional Node B), or may be referred to as a NodeB, an evolved NodeB), an MN (Master Node), an SN (Secondary Node), or another term in the art, provided that a same technical effect is achieved. The base station is not limited to a specific technical term.

For ease of description, the following describes some content involved in the embodiments of the present disclosure:

PUSCH (Physical Uplink Shared Channel) power control:

When the terminal transmits data through a PUSCH, transmit power of data may be determined by the following formula:

$$P_{PUSCH,f,c}(i, j, q_d, l) = \min \begin{cases} P_{CMAX,f,c}(i), \\ P_{O\_PUSCH,f,c}(j) + 10\log_{10}(2^\mu \cdot M_{RB,f,c}^{PUSCH}(i)) + \\ \alpha_{f,c}(j) \cdot PL_{f,c}(q_d) + \Delta_{TF,f,c}(i) + f_{f,c}(i, l) \end{cases}$$

A unit of $P_{PUSCH,f,c}(i, j, q_d, l)$ may be dBm (decibel-milliwatt), and its value is equal to the smaller value of $P_{CMAX,f,c}(i)$ and $P_{O\_PUSCH,f,c}(j)+10 \log_{10}(2\mu \cdot M_{RB,f,c}^{PUSCH}(i))+a_{f,c}(j)\cdot PL_{f,c}(q_d)+\Delta_{TF,f,c}(i)+f_{f,c}(i, l)$.

$P_{CMAX,f,c}(i)$: Transmit power of the terminal configured by the network side device. It can be learned from the foregoing formula that the transmit power of the data cannot exceed the maximum value $P_{CMAX,f,c}(i)$ configured by the network slave device.

$P_{O\_PUSCH,f,c}(j)$: initial power of a PUSCH. If it is configured by the network side device, it is determined through network configuration. If it is not configured by the network side device, it may be determined based on Msg3 (Message 3) of a RACH (Random Access Channel) procedure.

$M_{RB,b,f,c}^{PUSCH}(i)$: bandwidth allocated for a PUSCH resource (namely, a quantity of resource blocks).

$PL_{b,f,c}(q_d)$: estimated downlink path loss calculated by the UE.

$a_{b,f,c}(j)$: road loss offset.

A value of $\Delta_{TF,f,c}$ may be determined based on a parameter $K_S$ configured by the network side device. When $K_S=1.25$, $\Delta_{TF,f,c}(i)=10 \log_{10}((2^{BPRE \cdot K_S}-1)\cdot \beta_{offset}^{PUSCH}$. When $K_S=0$ $\Delta_{TF,f,c}(i)=0$. Further, both BPRE and $\beta_{offset}^{PUSCH}$ are determined depending on whether the PUSCH contains CSI (Channel State Information, channel state information).

$f_{f,c}(i, 1)=f_{f,c}(i-1, 1)+\delta_{PUSCH,f,c}(i-K_{PUSCH}, 1)$. Further, $f_{f,c}(i-1, 1)$ is a previous calculated value, and an initial value is 0. $\delta_{PUSCH,f,c}(i-K_{PUSCH}, 1)$ is a value calculated based on a TPC command in the PDCCH.

i represents an $i^{th}$ PUSCH transmission.

j represents a power adjustment value in a $j^{th}$ state agreed according to a protocol. For example, when j=0, that is, the network side device has not configured a parameter for power calculation, such as a PUCCH initial power offset configuration parameter, and the PUCCH initial power offset configuration parameter may be expressed as p0-pusch-alpha-setconfig, $P_{O\_PUSCH,f,c}(j)=P_{O\_NOMINAL\_PUSCH,f,c}(j)+P_{O\_UE\_PUSCH,f,c}(j)$. Further, $P_{O\_NOMINAL\_PUSCH,f,c}(0)=P_{O\_PRE}+\Delta_{PREAMBLE\_Msg3}$, where $P_{O\_PRE}$ is a value of initial random access preamble transmit power (i.e., Preamble Initial Received Target Power) for the random access procedure. $\Delta_{PREAMBLE\_Msg3}$ is Delta-preamble-msg3 configured by the network side device. $P_{O\_UE\_PUSCH,f,c}(0)=0$. When j=0, $a_{b,f,c}(0)=1$.

$q_d$ indicates an identifier of a reference signal used by the UE to calculate the downlink path loss.

l indicates a power control adjustment state of the TPC command in an $l^{th}$ state according to the protocol specification. For example, the network side device has configured a parameter for power calculation, such as a PUSCH power adjustment state configuration parameter, and the PUSCH power adjustment state configuration parameter may be expressed as num-pusch-pcadjustment-states, l∈ {0,1} Otherwise, l=0. The terminal may obtain a value of l through a downlink PDCCH control command, so as to know that a current PUSCH TPC command controls power of the $l^{th}$ type of PUSCH. The UE may maintain power of two types of PUSCHs.

b represents a BWP (Bandwidth Part, bandwidth part).

f represents a frequency.

c represents a cell c.

2-step random access channel (2-Step RACH) procedure.

In this embodiment of the present disclosure, as shown in FIG. 1, the 2-step random access procedure may include the following steps:

Step 201: A network side device configures a 2-step RACH configuration for a terminal. The configuration may include transmit resource information corresponding to Msg1 (Message 1) and Msg2 (Message 2).

Step 202: The terminal sends a request message Msg1 to the network side device, to trigger the 2-step RACH procedure, where the terminal may send the Msg1 through a PUSCH.

It should be noted that in this embodiment of the present disclosure, the Msg1 may include a data section and a non-data section. Specifically, the data section may be expressed as data information, which may be applied to small data transmission for a terminal in an inactive state, so as to reduce signaling overheads during terminal state transition. The non-data section may be expressed as control information for assistance in data information transmission.

Figure 2:
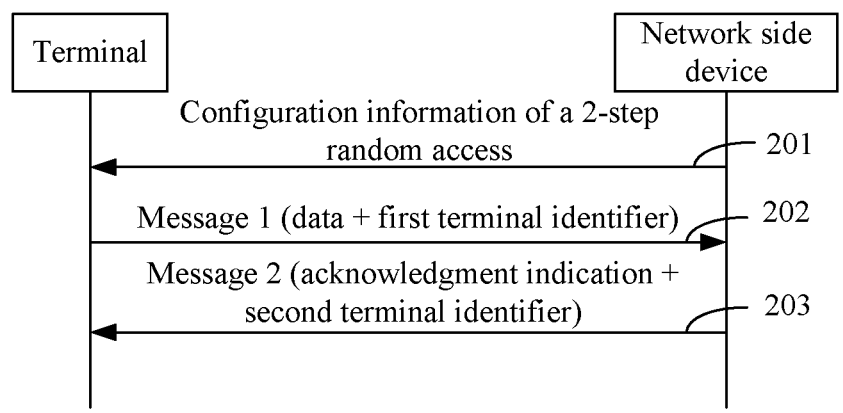
FIG. 2 is a flowchart of a random access procedure according to an embodiment of the present disclosure.

As shown in FIG. 2, the Msg1 may carry data and a first terminal identifier (UE-ID1).

Step 203: The network side device sends feedback information Msg2 to the terminal. As shown in FIG. 1, the Msg2 may carry a second terminal identifier (UE-ID2) and an acknowledgement indication (ACK Indication for short).

It should be noted that, if after receiving the Msg2, the terminal finds through parsing that the second terminal identifier carried in the Msg2 does not match the first terminal identifier carried in the Msg1 sent by the terminal, it may be considered as an Msg2 receiving failure, and the terminal needs to resend the Msg1, that is, retransmit the Msg1.

In another aspect, after receiving the Msg1, the network side device may instruct, through the Msg2, the terminal to retransmit the Msg1 if the network side device fails to obtain the data section in the Msg1.

When the terminal retransmits the Msg1, content included in the retransmitted Msg1 may be determined according to actual conditions. For example, if the terminal is instructed through the Msg2 to retransmit the Msg1, the terminal may retransmit only the data section in the Msg1. If the terminal fails to receive the Msg2 and actively retransmits the Msg1, the retransmitted Msg1 may include the data section and the non-data section.

When the retransmitted Msg1 includes the data section and the non-data section, the terminal may first retransmit the non-data section in the Msg1, and then retransmit the data section in the Msg1, or the terminal may simultaneously retransmit the data section and the non-data section in the Msg1.

It should be noted that, for a scenario in which the data section and the non-data section in the Msg1 are simultaneously retransmitted, the terminal may use retransmission power corresponding to the data section in the Msg1 to control retransmission of Msg1.

Considering that a retransmission success rate of data is positively correlated with retransmission power of the data, this embodiment of the present disclosure provides a power control method, which may be applied to retransmission of the data section in Msg1 of the random access procedure. The retransmission power of the data section in the Msg1 is controlled, to improve a retransmission success rate of the data section in the Msg1.

It should be noted that the Msg1 may be sent through a PUSCH. Therefore, in this embodiment of the present disclosure, the Msg1 may be considered as PUSCH data.

The following describes the power control method in the embodiments of the present disclosure.

Figure 3:
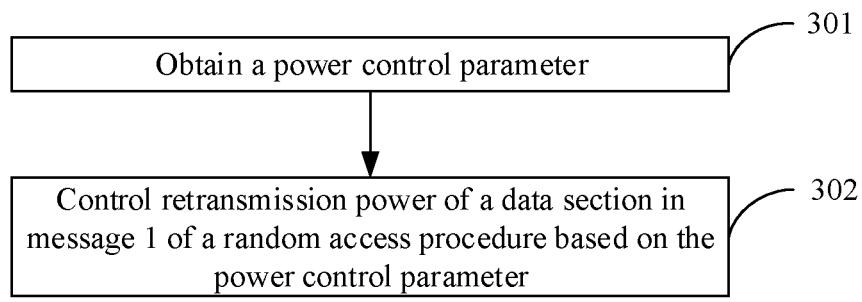
FIG. 3 is a first flowchart of a power control method according to an embodiment of the present disclosure.

Referring to FIG. 3, FIG. 3 is a first flowchart of a power control method according to an embodiment of the present disclosure. The power control method in this embodiment is applied to a terminal. As shown in FIG. 3, the power control method in this embodiment includes the following steps.

Step 301: Obtain a power control parameter.

In this embodiment, the power control parameter is used to control retransmission power of a data section in message 1 of a random access procedure. Optionally, the power control parameter may include at least one of a power ramping step and a power adjustment value.

The obtaining may be understood as obtaining through receiving, obtaining through requesting and then receiving, or obtaining through reading a communication protocol between a network side device and the terminal, which is specifically determined depending on content included in the power control parameter. This is not limited in this embodiment of the present disclosure.

For example, if the power control parameter is the power ramping step, the obtaining may be understood as: obtaining through receiving, or obtaining through reading the communication protocol between the network side device and the terminal. If the power control parameter is the power adjustment value, the obtaining may be understood as: obtaining through requesting and then receiving. Detailed descriptions are as follows.

Scenario 1: Obtaining Through Receiving

In practical application, the network side device may configure, for the terminal, a power control parameter that includes the power ramping step (or referred to as a power ramping configuration parameter). Specifically, the network side device may configure the power control parameter in an RRC (Radio Resource Control) message or another downlink message, and send it to the terminal. The power ramping step (POWER_RAMPING_STEP) is a value by which power of each retransmission increases, for example, PUSCH_POWER_RAMPING_STEP (a power ramping step of data retransmitted through a PUSCH).

In this way, the network side device may determine the power ramping step according to actual needs, and then configure the power ramping step in a downlink message to be sent to the terminal, thereby improving flexibility of determining the power ramping step.

Scenario 2: Obtaining Through Reading the Communication Protocol Between the Network Side Device and the Terminal A system may directly build the power ramping step into the communication protocol between the network side device and the terminal.

In this way, the terminal may directly read the power ramping step from the communication protocol, instead of determining a power adjustment step according to an instruction from the network side device, thereby saving system overheads.

It should be understood that a value of the power ramping step may be specifically determined according to actual conditions. For example, the power ramping step may be set to 2 dB, which is not limited in this embodiment of the present disclosure.

Scenario 3: Obtaining Through Requesting and then Receiving

The 2-step random access procedure is used as an example. The terminal sends a request message Msg1 to the network side device to trigger the 2-step RACH procedure. After receiving the Msg1, if the network side device fails to obtain the data section in the Msg1, the network side device may configure, in a feedback message Msg2, a TPC command that includes the power adjustment value, to instruct the terminal to retransmit the data section in the Msg1 based on the foregoing power adjustment value.

In this way, the network side device may directly configure the power control parameter in the feedback message Msg2, so that system signaling overheads can be saved when compared with a scenario in which the network side device sends the power control parameter to the terminal through another downlink message.

It should be understood that the power adjustment value may be specifically determined according to actual conditions, which is not limited in this embodiment of the present disclosure.

In addition, it should be noted that for different obtaining scenarios, the timing for the terminal to obtain the power control parameter may also be different, which may be specifically determined according to actual needs. This is not limited in this embodiment of the present disclosure.

Specifically, for scenario 1 and scenario 2, the terminal may obtain the power control parameter after determining that the terminal fails to receive the Msg2, or after contention-based random access fails, to control the retransmission power of the data section in the Msg1, or the terminal may obtain the power control parameter before determining that receiving the Msg2 fails, or even before triggering the random access procedure. For scenario 3, because the power adjustment value is carried in the Msg2, after receiving the Msg2, the terminal obtains the power control parameter by parsing the Msg2.

Step 302: Control the retransmission power of the data section in the message 1 of the random access procedure based on the power control parameter.

It should be understood that the terminal in this embodiment controls the retransmission power of the data section in the Msg1 of the random access procedure based on the obtained power control parameter.

Therefore, it can be understood that a manner of controlling the retransmission power by the terminal is specifically determined based on a type of the power control parameter obtained by the terminal. The specific descriptions are as follows.

Manner 1: The Terminal Obtains the Power Ramping Step, and does not Obtain the Power Adjustment Value In other words, in this manner, the control parameter is the power ramping step. The power ramping step may be configured in a downlink message such as an RRC message by the network side device for sending, or obtained as agreed in a protocol. Therefore, this manner is applicable to a scenario in which the terminal actively performs retransmission.

Optionally, when the retransmission power of the data section in the message 1 is less than a specified maximum value of retransmission power, the retransmission power of the data section in the message 1 is positively correlated with a retransmission sequence number of the data section in the message 1.

To be specific, when the retransmission power of the data section in the message 1 is less than the specified maximum value of retransmission power, the retransmission power of the data section in the message 1 may increase with the retransmission sequence number of the data section in the message 1.

The retransmission sequence number of the data section in the message 1 is associated with a terminal-expected quantity of retransmissions of the data section in the message 1 (namely, quantity of expected retransmissions). Specifically, if the terminal expects to retransmit the data section in the message 1 for an $i^{th}$ time, the retransmission sequence number of the data section is i, where i is a positive integer.

In practical application, if the terminal prepares for retransmission of the data section in the message 1, for example, the terminal calculates, based on the power ramping step, the retransmission power required to retransmit the data section in the message 1, it may be considered that the terminal expects to retransmit the data section in the message 1. It can be learned that the quantity of expected retransmissions has nothing to do with whether the terminal completes or abandons retransmission of the data section in the message 1.

The specified maximum value of retransmission power may be used to represent maximum retransmission power of the terminal under the premise that terminals do not interfere with each other in terms of inter-terminal communications. In other words, if the retransmission power of the terminal exceeds the specified maximum value of retransmission power, interference is caused to communication quality of another terminal, which hinders system communication. In specific implementation, the specified maximum value of retransmission power may be configured by the network side, for example, $P_{CMAX,f,c}(i)$, or may be predefined in a protocol, which may be specifically determined according to actual needs. This is not limited in this embodiment of the present disclosure.

In this way, under the premise that terminals do not interfere with each other in terms of inter-terminal communications, the retransmission power of the data section in the message 1 may be increased as the retransmission sequence number of the data section in the message 1 increases, thereby improving the retransmission success rate of the data section in the message 1.

After preparing for retransmission, the terminal may choose to abandon the retransmission or complete the retransmission. It is assumed that a control manner in which the terminal controls the retransmission power based on the power ramping step is: each time the retransmission sequence number of the data section in the message 1 increases by 1, the retransmission power of the data section in the message 1 increases by k power ramping steps. In this case, if the terminal abandons the $i^{th}$ retransmission, retransmission power of an $(i+1)^{th}$ retransmission by the terminal increases by 2k power ramping steps compared with retransmission power of an $(i-1)^{th}$ retransmission. k is a positive integer, and may be set in advance according to actual conditions, for example, k is equal to 1. i is a positive integer, and if i is equal to 1, $(i-1)^{th}$ retransmission of the data section in the message 1 may be understood as transmitting the data section in the message 1 for the first time.

However, after the retransmission power of the $(i-1)^{th}$ retransmission increases by k power ramping steps, there is a possibility that the terminal successfully retransmits the data section in the message 1 by using the increased retransmission power. It can be learned that controlling the retransmission power in the foregoing control manner and retransmitting the data section in the message 1 by using the controlled retransmission power cause a waste of terminal power.

In order to reduce a waste of terminal power, in some embodiments, optionally, the controlling the retransmission power of the data section in the message 1 of the random access procedure based on the power control parameter may include:

determining an amount of power ramping, where the amount of power ramping is a product of N and the power ramping step, and the N is a sum of a quantity T of actual retransmissions of the data section in the message 1 and 1; and controlling the retransmission power of the data section in the message 1 based on the amount of power ramping.

The quantity T of actual retransmissions indicates a quantity of transmissions actually completed by the terminal. It should be understood that a sum of the quantity of actual retransmissions by the terminal and a quantity of abandoned retransmissions is equal to a maximum retransmission sequence number. The relationship between the quantity of actual retransmissions and the quantity of actual transmissions is: Quantity of actual transmissions=Quantity of actual retransmissions+1 (1 represents the first transmission). T is an integer greater than or equal to 0.

It should be noted that the amount of power ramping (POWER_RAMPING) determined in this optional step is an actual amount of power ramping of a $(T+1)^{th}$ retransmission by the terminal. Correspondingly, the retransmission power obtained based on the amount of power ramping is retransmission power of the $(T+1)^{th}$ actual retransmission, performed by the terminal, of the data section in the message 1. Therefore, N in this optional step is the sum of the quantity T of actual retransmissions of the data section in the message 1 and 1.

In practical application, the terminal may be configured with a power ramping counter (POWER_RAMPING_COUNTER) for recording a quantity of power ramping times. In specific implementation, the power ramping counter may add 1 to a recorded quantity of power ramping times only after the terminal completes one retransmission. Certainly, the power ramping counter may also add 1 to the recorded quantity of power ramping times when the terminal prepares for the $(T+1)^{th}$ retransmission.

Scenario 1: The Power Ramping Counter Adds 1 to the Recorded Quantity of Power Ramping Times Only after the Terminal Completes One Retransmission If a value of the power ramping counter is equal to the quantity of actual retransmissions of the data section in the message 1, namely, T, an initial value of the power ramping counter is 1, and Amount of power ramping of the actual $(T+1)^{th}$ retransmission=(Value of the power ramping counter+1)×Power ramping step. If a value of the power ramping counter is equal to the quantity of actual transmissions of the data section in the message 1, namely, T+1, an initial value of the power ramping counter is 0, that is, power ramping is not performed for the first transmission, and Amount of power ramping of the actual $(T+1)^{th}$ retransmission=Value of the power ramping counter×Power ramping step.

In this scenario, the power ramping counter adds 1 to the recorded quantity of power ramping times only after the terminal completes one retransmission. Therefore, if the terminal abandons a retransmission, for the abandoned retransmission, the terminal may control the quantity of power ramping times recorded by the power ramping counter not to increase.

Scenario 2: The Power Ramping Counter Adds 1 to the Recorded Quantity of Power Ramping Times when the Terminal Prepares for the $(T+1)^{th}$ Retransmission If a value of the power ramping counter is equal to the sum of the quantity of actual retransmissions of the data section in the message 1, namely, T+1, an initial value of the power ramping counter is 1, and Amount of power ramping of the actual $(T+1)^{th}$ retransmission=Value of the power ramping counter×Power ramping step. If the value of the power ramping counter is equal to the sum of the quantity of actual transmissions of the data section in the message 1 and 1, namely, T+2, an initial value of the power ramping counter is 2, and Amount of power ramping of the actual $(T+1)^{th}$ retransmission=(Value of the power ramping counter−1)×Power ramping step.

In this scenario, the power ramping counter adds 1 to the recorded quantity of power ramping times when the terminal prepares for the $(T+1)^{th}$ retransmission. Therefore, if the terminal abandons a retransmission, when the terminal prepares for a next retransmission following the abandoned retransmission, the quantity of power ramping times recorded by the power ramping counter is controlled not to increase.

After determining the amount of power ramping, the terminal controls the retransmission power of the data section in the message 1 based on the amount of power ramping. Specifically, the retransmission power of the $(T+1)^{th}$ actual retransmission by the terminal may be calculated according to the following two formulas:

$$P_{PUSCH,f,c}(i, j, q_d, l) = \min\begin{cases} P_{CMAX,f,c}(i), \\ P_{O\_PUSCH,f,c}(j) + 10\log_{10}(2^{\mu} \cdot M_{RB,f,c}^{PUSCH}(i)) + \\ \alpha_{f,c}(j) \cdot PL_{f,c}(q_d) + \Delta_{TF,f,c}(i) + \Delta_{f,c}(i, l) + P_R \end{cases} \quad \text{Formula 1}$$

A unit of $P_{PUSCH,f,c}(i, j, q_d, l)$ may be dBm (decibel-milliwatt), and its value is equal to the smaller value of $P_{CMAX,f,c}(i)$ and $P_{O\_PUSCH,f,c}(j)+10\log_{10}(2\mu \cdot M_{RB,f,c}^{PUSCH}(i))+a_{f,c}(j) \cdot PL_{f,c}(q_d)+\Delta_{TF,f,c}(i)+f_{f,c}(i, l)+P_R$.

$P_R$ represents the amount of power ramping of the actual $(T+1)^{th}$ retransmission determined by the terminal. It should be noted that meanings of other parameters in the formula are the same as the meanings of the parameters in the foregoing formula for calculating transmit power of PUSCH power control data. For details, refer to the foregoing description, which is not described herein again.

$$P_{PUSCH,f,c}(i, j, q_d, l) = \min\begin{cases} P_{CMAX,f,c}(i), \\ P_{PUSCH,target,f,c}(j) + PL_{f,c}(q_d) \end{cases} \quad \text{Formula 2}$$

A unit of $P_{PUSCH,f,c}(i, j, q_d, l)$ may be dBm (decibel-milliwatt), and its value is equal to the smaller value of $P_{CMAX,f,c}(i)$ and $P_{PUSCH,target,f,c}(j)+PL_{f,c}(q_d)$.

$P_{PUSCH,target,f,c}(j)=P_{0\_PUSCH}+\text{deltaPUSCH}+P_R$. Further, $P_R$ represents the amount of power ramping of the actual $(T+1)^{th}$ retransmission determined by the terminal. $P_{0\_PUSCH}$ represents initial transmit power of a PUSCH. deltaPUSCH represents a transmit power offset of a PUSCH, and may be specifically determined based on a transmit format of a PUSCH, for example, whether to send CSI, a transmit bandwidth, a transmitted RB (Radio Bear), and the like.

In this manner, the terminal does not receive the power adjustment value sent by the network side device, and obtains only the power ramping step. Therefore, the terminal may control the retransmission power of the data section in the message 1 based on the power ramping step, thereby improving a retransmission success rate of the data section in the message 1.

Manner 2: The Terminal Obtains the Power Adjustment Value, and does not Obtain the Power Ramping Step That is, in this manner, the power control parameter is the power adjustment value.

Optionally, obtaining a power control parameter may include:

receiving message 2 sent by the network side device, where the message 2 includes a transmit power control TPC command that indicates the power adjustment value.

The power adjustment value in this manner is carried in the message 2 sent by the network side device. Therefore, this manner is applicable to a scenario in which the network side device instructs a retransmission.

This embodiment of the present disclosure is used to control the retransmission power of the data section in the message 1. Therefore, it can be understood that before receiving the message 2 sent by the network side device, the terminal sends a request message Msg1 to the network side device.

After receiving the Msg1 retransmitted for the $m^{th}$ time, if the network side device fails to obtain the data section in the Msg1, the network side device may configure, in the feedback message Msg2, the TPC command that includes the power adjustment value, to instruct the terminal to control power of the $(m+1)^{th}$ retransmission of the data section in the message 1 based on the foregoing power adjustment value. It can be learned that the power adjustment value received in this optional step is used for power control of a next retransmission. Herein, m is an integer greater than or equal to 0.

It can be learned that in this manner, the network side device adds the power control parameter into the feedback message Msg2 of the random access procedure, so that system signaling overheads can be saved when compared with a scenario in which the network side device sends the power control parameter to the terminal through another downlink message.

After receiving the power adjustment value, the terminal controls the retransmission power of the data section in the message 1 based on the power adjustment value. Specifically, retransmission power of the next actual retransmission performed by the terminal may be calculated according to the following formula:

$$P_{PUSCH,f,c}(i, j, q_d, l) = \min\begin{cases} P_{CMAX,f,c}(i), \\ P_{O\_PUSCH,f,c}(j) + 10\log_{10}(2^\mu \cdot M_{RB,f,c}^{PUSCH}(i)) + \\ \alpha_{f,c}(j) \cdot PL_{f,c}(q_d) + \Delta_{TF,f,c}(i) + f_{f,c}(i, l) \end{cases}$$

A unit of $P_{PUSCH,f,c}(i, j, q_d, l)$ may be dBm (decibel-milliwatt), and its value is equal to the smaller value of $P_{CMAX,f,c}(i)$ and $P_{O\_PUSCH,f,c}(j)+10 \log_{10}(2\mu \cdot M_{RB,f,c}^{PUSCH}(i))+a_{f,c}(j) \cdot PL_{f,c}(q_d)+\Delta_{TF,f,c}(i)+f_{f,c}(i, l)$.

$\Delta_{TF,f,c}(i)$ represents the power adjustment value. It should be noted that meaning of other parameters in the formula are the same as the meanings of the parameters in the foregoing formula for calculating transmit power of PUSCH power control data. For details, refer to the foregoing description, which is not described herein again.

In this manner, the terminal does not obtain the power ramping step, and receives only the power adjustment value. Therefore, the terminal may control the retransmission power of the data section in the message 1 based on the power adjustment value, thereby improving the retransmission success rate of the data section in the message 1.

In addition, in this manner, after failing to receive the data section in the message 1, the network side device may add the power adjustment value used to control the transmit power of the next transmission into the feedback message of the failed reception. Compared with Manner 1, the terminal controls the retransmission power of the data section in the message 1 based on the power ramping step, which can improve flexibility of retransmit power control. However, it should be understood that, compared to Manner 2, Manner 1 can effectively reduce signaling interaction between the network side device and the terminal, and improve system resource utilization.

Manner 3: The Terminal Obtains the Power Ramping Step and Power Adjustment Value In this manner, the terminal obtains the power ramping step and the power adjustment value. In this case, the terminal may select either of the power ramping step and the power adjustment value to control the retransmission power of the data section in the message 1 of the random access procedure; or control the retransmission power of the data section in the message 1 of the random access procedure based on both the power adjustment value and the power ramping step, which may be specifically determined according to actual needs. This is not limited in this embodiment of the present disclosure.

Optionally, the controlling the retransmission power of the data section in the message 1 of the random access procedure based on the power control parameter may include:

if the power ramping step and the power adjustment value are obtained, controlling the retransmission power of the data section in the message 1 of the random access procedure based on the power adjustment value; or if the power ramping step and the power adjustment value are obtained, controlling the retransmission power of the data section in the message 1 of the random access procedure based on the power ramping step; or if the power ramping step and the power adjustment value are obtained, controlling the retransmission power of the data section in the message 1 of the random access procedure based on the power adjustment value and power ramping step.

It should be noted that if the terminal selects only either of the power ramping step and the power adjustment value to control the retransmission power of the data section in the message 1 of the random access procedure, a manner in which terminal controls power adjustment is the same as the control manners in Manner 1 and Manner 2. For details, refer to the descriptions in Manner 1 and Manner 2. Details are not described herein again.

For a scenario in which the terminal controls the retransmission power of the data section in the message 1 of the random access procedure based on the power adjustment value and the power ramping step, the retransmission power of the next actual retransmission performed by the terminal may be calculated by using the following formula:

$$P_{PUSCH,f,c}(i, j, q_d, l) =$$

$$\min\begin{cases} P_{CMAX,f,c}(i), \\ P_{O\_PUSCH,f,c}(j) + 10\log_{10}(2^\mu \cdot M_{RB,f,c}^{PUSCH}(i)) + \\ \alpha_{f,c}(j) \cdot PL_{f,c}(q_d) + \Delta_{TF,f,c}(i) + f_{f,c}(i, l) + P_R \end{cases}$$

A unit of $P_{PUSCH,f,c}(i, j, q_d, l)$ may be dBm (decibel-milliwatt), and its value is equal to the smaller value of $P_{CMAX,f,c}(i)$ and $P_{O\_PUSCH,f,c}(j)+10 \log_{10}(2\mu \cdot M_{RB,f,c}^{PUSCH}(i))+a_{f,c}(j) \cdot PL_{f,c}(q_d)+\Delta_{TF,f,c}(i)+f_{f,c}(i, l)+P_R$.

$P_R$ represents the amount of power ramping of the $(N+1)^{th}$ actual retransmission determined by the terminal.

$\Delta_{TF,f,c}(i)$ indicates the power adjustment value.

$f_{f,c}(i, l)=f_{f,c}(i-1, l)+\delta_{PUSCH,f,c}(i-K_{PUSCH}, l)$: It is a previously calculated value, and an initial value is 0. $\delta_{PUSCH,f,c}(i-K_{PUSCH}, l)$ is a value calculated based on a TPC control command in a PDCCH.

It should be noted that meanings of other parameters in the formula are the same as the meanings of the parameters in the foregoing formula for calculating transmit power of PUSCH power control data. For details, refer to the forgoing description. Details are not described herein again.

In this manner, the terminal obtains the power ramping step and power adjustment value, and the terminal may control the retransmission power of the data section in the message 1 based on the power adjustment value and/or power ramping step, thereby improving the retransmission success rate of the data section in the message 1.

In the power control method of this embodiment, the power control parameter is obtained, and the retransmission power of the data section in the message 1 of the random access procedure is controlled based on the power control parameter. It can be learned that when the terminal retransmits the data section in the message 1, the terminal may adjust the retransmission power of the data section in the message 1 based on the obtained power control parameter, thereby improving the retransmission success rate of the data section in the message 1.

It should be noted that the plurality of optional implementations described in the embodiments of the present disclosure may be implemented in combination with each other or may be implemented separately. This is not limited in the embodiments of the present disclosure.

For ease of understanding, the following four embodiments are used as examples for illustration.

Embodiment 1: Power Ramping Step

Step 0: A network side device configures, for a terminal, a power ramping configuration parameter used to send data (for example, PUSCH), where the power ramping configuration parameter used to send data includes:

a power ramping step (namely, a power ramping value for each retransmission (for example, PUSCH_POWER_RAMPING_STEP), where the power ramping step is, for example, 2 dB).

Step 1.1: UE triggers data (for example, PUSCH) transmission, where a power ramping value used to transmit the data is calculated based on a quantity of transmissions. For example:

PUSCH_POWER_RAMPING=(PUSCH_POWER_RAMPING_COUNTER−1)×PUSCH_POWER_RAMPING_STEP

PUSCH_POWER_RAMPING: a power ramping value. The amount of power ramping is a power ramping value of a $(T+1)^{th}$ actual retransmission by the terminal. T indicates a quantity of actual retransmissions, namely, a quantity of retransmissions actually completed by the terminal.

PUSCH_POWER_RAMPING_COUNTER: a power ramping counter, namely, a quantity of power ramping times. The power ramping counter adds 1 to a recorded power ramping times when the terminal prepares for the $(T+1)^{th}$ retransmission. A value of the power ramping counter is equal to a sum of a quantity of actual transmissions of a data section in message 1 and 1, namely, T+2. In this case, an initial value of the power ramping counter is 2.

PUSCH_POWER_RAMPING_STEP: a power ramping step.

When the UE abandons a data transmission (for example, the PUSCH is not sent), the UE does not perform power ramping during a next data transmission based on information about the abandonment (for example, PUSCH_POWER_RAMPING_COUNTER does not increase). Otherwise, the UE performs power ramping each time data is retransmitted (for example, PUSCH_POWER_RAMPING_COUNTER increases by 1).

Step 1.2: A formula for calculating transmit power used to transmit data (for example, PUSCH) of the UE is to add the amount of power ramping each time the transmit power used to transmit the data is calculated.

For example: Formula 1 (equivalent to Formula 1 in Manner 1)

$$P_{PUSCH,f,c}(i, j, q_d, l) = \min \begin{cases} P_{CMAX,f,c}(i), \\ P_{O\_PUSCH,f,c}(j) + 10\log_{10}(2^{\mu} \cdot M_{RB,f,c}^{PUSCH}(i)) + \\ \alpha_{f,c}(j) \cdot PL_{f,c}(q_d) + \Delta_{TF,f,c}(i) + f_{f,c}(i, l) + P_R \end{cases}$$

For example: Formula 2 (equivalent to Formula 2 in Manner 1)

$$P_{PUSCH,f,c}(i, j, q_d, l) = \min \begin{cases} P_{CMAX,f,c}(i), \\ P_{PUSCH,target,f,c}(j) + PL_{f,c}(q_d) \end{cases}$$

For details, refer to the description of Formula 1 and Formula 2 in the foregoing manner 1. Details are not described herein again.

Embodiment 2: Msg2 Provides a Power Control Command

Step 1: UE triggers data (for example, PUSCH) transmission, for example, the UE triggers transmission of Msg1 of a 2-step RACH.

Step 2: The UE receives a feedback message sent by a network side device, for example, Msg2 of the 2-step RACH. The feedback message indicates a power adjustment value (or referred to as a power adjustment amount) used for a next data transmission by the terminal. For example, the feedback message may carry a TPC command that includes the power adjustment value.

Step 3. When performing a next data transmission (for example, retransmission of the Msg1 of the 2-step RACH), the UE performs, based on the power adjustment value in step 2, power adjustment for data transmission. A formula for calculation is as follows:

$$P_{PUSCH,f,c}(i, j, q_d, l) = \min \begin{cases} P_{CMAX,f,c}(i), \\ P_{O\_PUSCH,f,c}(j) + 10\log_{10}(2^{\mu} \cdot M_{RB,f,c}^{PUSCH}(i)) + \\ \alpha_{f,c}(j) \cdot PL_{f,c}(q_d) + \Delta_{TF,f,c}(i) + f_{f,c}(i, l) \end{cases}$$

This formula is equivalent to the formula in Manner 2. For details, refer to the description of the formula in the foregoing Manner 2. Details are not described herein again.

Embodiment 3: Either of Msg2 Power Control or Terminal Power Ramp

Step 0: Same as step 0 in Embodiment 1.

Step 1: The terminal triggers data (for example, PUSCH) transmission, for example, triggers transmission of Msg1 of a 2-step RACH.

Step 2:

If the terminal receives power adjustment value information (for example, a power adjustment command in the Msg2 of the 2-step RACH) sent by the network side device, the terminal uses the power adjustment method in Embodiment 2 to adjust power used to transmit data (for example, retransmit the Msg1 of the 2-step RACH) next time.

If the terminal does not receive power adjustment value information sent by a network side, the terminal uses the power adjustment method in Embodiment 1 to adjust power used to transmit data (for example, retransmit the Msg1 of the 2-step RACH) next time.

Embodiment 4: Msg2 Power Control and Terminal Power Ramping are Allowed to be Used at the Same Time for Each Retransmission of the Msg1

Step 0: Same as step 0 in Embodiment 1.

Step 1: The terminal triggers data (for example, PUSCH) transmission, for example, triggers transmission of Msg1 of a 2-step RACH.

Step 2:

If the terminal receives power adjustment value information sent by a network side (for example, a power adjustment command in the Msg2 of the 2-step RACH), the terminal uses both the power adjustment methods in Embodiment 1 and Embodiment 2 to adjust power used to transmit data (for example, retransmit the Msg1 of the 2-step RACH) next time. (That is, the terminal performs power ramping during a next data transmission, and at the same time, performs power adjustment based on the power adjustment value information sent by the network side).

A formula for calculation is as follows:

$$P_{PUSCH,f,c}(i, j, q_d, l) = \min\begin{Bmatrix} P_{CMAX,f,c}(i), \\ P_{O\_PUSCH,f,c}(j) + 10\log_{10}(2^\mu \cdot M_{RB,f,c}^{PUSCH}(i)) + \\ \alpha_{f,c}(j) \cdot PL_{f,c}(q_d) + \Delta_{TF,f,c}(i) + f_{f,c}(i, l) + P_R \end{Bmatrix}$$

This formula is equivalent to the formula in Manner 3. For details, refer to the description of the formula in the foregoing Manner 3. Details are not described herein again.

If the terminal does not receive the power adjustment value information sent by the network side device, the terminal uses the power adjustment method in Embodiment 1 to adjust power used to transmit data (for example, retransmit the Msg1 of the 2-step RACH) next time.

The foregoing embodiments include at least the following invention points:

Embodiment 1:

Power ramping is performed during retransmission of a PUSCH, the power ramping step may be configured by a network side device or agreed in a protocol.

If the PUSCH is not sent but is discarded, power ramping is skipped for retransmission of the PUSCH.

Embodiment 2:

Power adjustment is performed based on a power control command in Msg2 during retransmission of a PUSCH.

Embodiment 3:

During retransmission of a PUSCH, if a power control command in Msg2 is received, power adjustment is performed based on the power control command in the Msg2; or if a power control command in Msg2 is not received, power ramping is performed during retransmission of the PUSCH. The power ramping step is configured by a network.

Embodiment 4:

During retransmission of a PUSCH, if a power control command and a power ramping step in Msg2 are obtained, power adjustment is performed based on the power control command and the power ramping step.

The foregoing embodiments include at least the following beneficial effects:

Power adjustment may be implemented when the terminal retransmits the PUSCH (for example, retransmits Msg1 of a 2-step RACH), thereby improving a PUSCH transmission success rate of the terminal.

Figure 4:
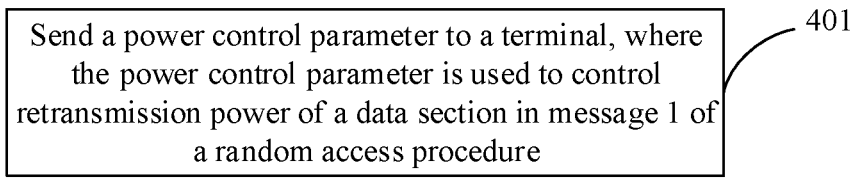
FIG. 4 is a second flowchart of a power control method according to an embodiment of the present disclosure.

Referring to FIG. 4, FIG. 4 is a second flowchart of a power control method according to an embodiment of the present disclosure. The power control method in this embodiment is applied to a network side device. As shown in FIG. 4, the power control method in this embodiment includes the following step:

Step 401: Send a power control parameter to the terminal, where the power control parameter is used to control retransmission power of a data section in message 1 of a random access procedure.

Optionally, the power control parameter includes at least one of a power ramping step and a power adjustment value.

Optionally, the power control parameter includes a power adjustment value; and the sending a power control parameter to the terminal includes:

sending message 2 to the terminal, where the message 2 carries a TPC command that includes the power adjustment value.

It should be noted that this embodiment serves as an embodiment of the method on a network side corresponding to the foregoing method embodiment on the terminal side. Therefore, reference may be made to related description in the foregoing method embodiment, and same beneficial effects can be achieved. To avoid repeated description, details are not described herein again.

Figure 5:
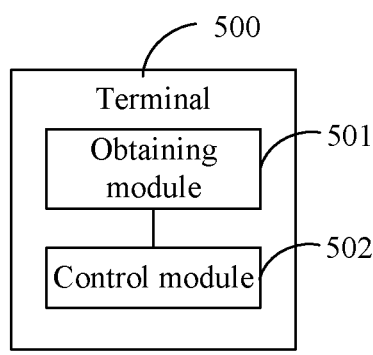
FIG. 5 is a first structural diagram of a terminal according to an embodiment of the present disclosure.

Referring to FIG. 5, FIG. 5 is a first structural diagram of a terminal according to an embodiment of the present disclosure. As shown in FIG. 5, the terminal 500 includes:

an obtaining module 501, configured to obtain a power control parameter; and a control module 502, configured to control retransmission power of a data section in message 1 of a random access procedure based on the power control parameter.

Optionally, the power control parameter includes at least one of a power ramping step and a power adjustment value.

Optionally, the power control parameter is the power ramping step; and when the retransmission power of the data section in the message 1 is less than a specified maximum value of retransmission power, the retransmission power of the data section in the message 1 is positively correlated with a retransmission sequence number of the data section in the message 1.

Optionally, the control module 502 specifically includes:

a determining unit, configured to determine an amount of power ramping, where the amount of power ramping is a product of N and the power ramping step, and N is a sum of a quantity of actual retransmissions of the data section in the message 1 and 1; and a control unit, configured to control the retransmission power of the data section in the message 1 based on the amount of power ramping.

Optionally, the power control parameter is the power adjustment value.

Optionally, the obtaining module 501 is specifically configured to:

receive message 2 sent by a network side device, where the message 2 includes a transmit power control TPC command that indicates the power adjustment value.

Optionally, the control module 502 is specifically configured to:

if the power ramping step and the power adjustment value are obtained, control the retransmission power of the data section in the message 1 of the random access procedure based on the power adjustment value; or if the power ramping step and the power adjustment value are obtained, control the retransmission power of the data section in the message 1 of the random access procedure based on the power ramping step; or if the power ramping step and the power adjustment value are obtained, control the retransmission power of the data section in the message 1 of the random access procedure based on the power adjustment value and the power ramping step.

The terminal 500 can implement each process implemented by the terminal in the foregoing method embodiments of the present disclosure, and achieve same beneficial effects. To avoid repetition, details are not described herein again.

Figure 6:
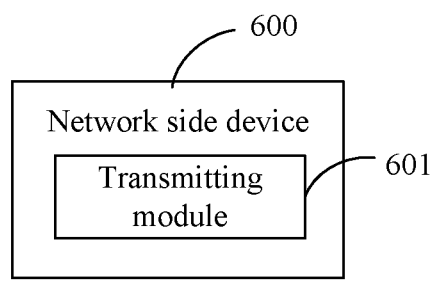
FIG. 6 is a first structural diagram of a network side device according to an embodiment of the present disclosure.

Referring to FIG. 6, FIG. 6 is a first structural diagram of a network side device according to an embodiment of the present disclosure. As shown in FIG. 6, the network side device 600 further includes:

a transmitting module 601, configured to send a power control parameter to a terminal, where the power control parameter is used to control retransmission power of a data section in message 1 of a random access procedure.

Optionally, the power control parameter includes at least one of a power ramping step and a power adjustment value.

Optionally, the power control parameter includes the power adjustment value; and the transmitting module 601 is specifically configured to:
send message 2 to the terminal, where the message 2 carries a TPC command that includes the power adjustment value.

The network side device 600 can implement each process implemented by the network side device in the foregoing method embodiments of the present disclosure, and achieve same beneficial effects. To avoid repetition, details are not described herein again.

Figure 7:
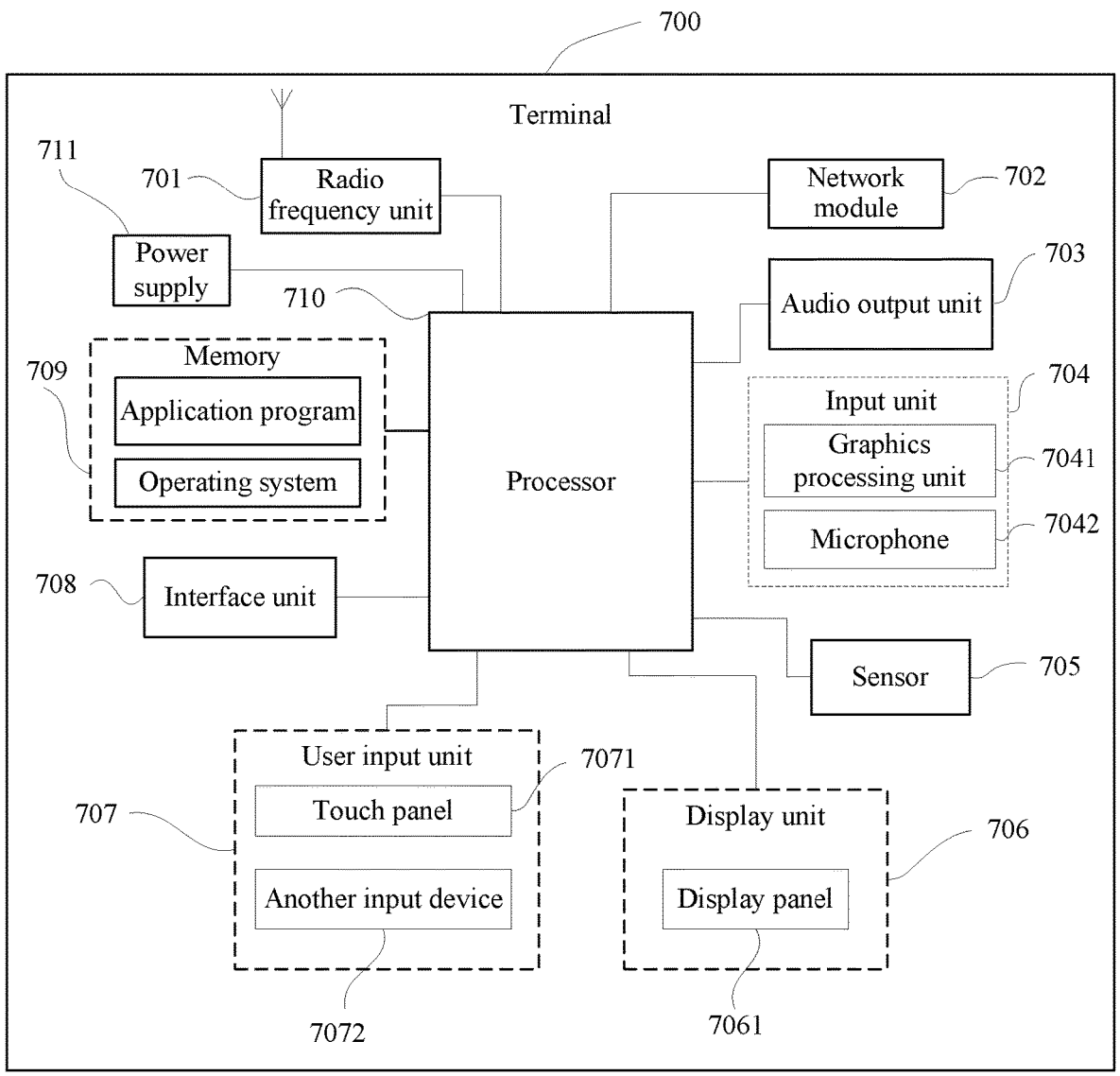
FIG. 7 is a second structural diagram of a terminal according to an embodiment of the present disclosure.

Referring to FIG. 7, FIG. 7 is a second structural diagram of a terminal according to an embodiment of the present disclosure. The terminal may be a schematic structural diagram of hardware of a terminal for implementing the embodiments of the present disclosure. As shown in FIG. 7, the terminal 700 includes but is not limited to: a radio frequency unit 701, a network module 702, an audio output unit 703, an input unit 704, a sensor 705, a display unit 706, a user input unit 707, an interface unit 708, a memory 709, a processor 710, a power supply 711, and the like. It can be understood by persons skilled in the art that the structure of the terminal shown in FIG. 7 does not constitute a limitation on the terminal, and the terminal may include more or fewer components than those shown in the figure, or combine some components, or have different component arrangements. In the embodiments of the present disclosure, the terminal includes, but is not limited to, a mobile phone, a tablet computer, a notebook computer, a palmtop computer, a vehicle-mounted terminal, a wearable device, a pedometer, or the like.

The processor 710 is configured to:
obtain a power control parameter; and
control retransmission power of a data section in message 1 of a random access procedure based on the power control parameter.

Optionally, the power control parameter includes at least one of a power ramping step and a power adjustment value.

Optionally, the power control parameter is the power ramping step; and when the retransmission power of the data section in the message 1 is less than a specified maximum value of retransmission power, the retransmission power of the data section in the message 1 is positively correlated with a retransmission sequence number of the data section in the message 1.

Optionally, the processor 710 is further configured to:
determine an amount of power ramping, where the amount of power ramping is a product of N and the power ramping step, and N is a sum of a quantity of actual retransmissions of the data section in the message 1 and 1; and
control the retransmission power of the data section in the message 1 based on the amount of power ramping.

Optionally, the power control parameter is the power adjustment value; and the radio frequency unit 701 is configured to receive message 2 sent by a network side device, where the message 2 includes a transmit power control TPC command that indicates the power adjustment value.

Optionally, the processor 710 is further configured to:
if the power ramping step and the power adjustment value are obtained, control the retransmission power of the data section in the message 1 of the random access procedure based on the power adjustment value; or if the power ramping step and the power adjustment value are obtained, control the retransmission power of the data section in the message 1 of the random access procedure based on the power ramping step; or if the power ramping step and the power adjustment value are obtained, control the retransmission power of the data section in the message 1 of the random access procedure based on the power adjustment value and the power ramping step.

It should be noted that the foregoing terminal 700 in this embodiment can implement each process in the foregoing method embodiments in the embodiments of the present disclosure, and achieve same beneficial effects. To avoid repetition, details are not described herein again.

It should be understood that, in this embodiment of the present disclosure, the radio frequency unit 701 may be configured to receive and transmit information, or receive and transmit signals during a call. Specifically, the radio frequency unit 701 receives downlink data from a base station, and transmits the downlink data to the processor 710 for processing; and in addition, transmits uplink data to the base station. Generally, the radio frequency unit 701 includes but is not limited to an antenna, at least one amplifier, a transceiver, a coupler, a low noise amplifier, a duplexer, and the like. In addition, the radio frequency unit 701 may further communicate with network and another equipment via a wireless communication system.

The terminal provides a user with wireless broadband Internet access through the network module 702, for example, helps the user send and receive emails, browse web pages, and access streaming media.

The audio output unit 703 may convert audio data received by the radio frequency unit 701 or the network module 702 or stored in the memory 709 into an audio signal, and output the audio signal as sound. Moreover, the audio output unit 703 may further provide an audio output (for example, call signal receiving sound and message receiving sound) related to a specific function performed by the terminal 700. The audio output unit 703 includes a speaker, a buzzer, a receiver, and the like.

The input unit 704 is configured to receive an audio signal or a video signal. The input unit 704 may include a graphics processing unit (GPU) 7041 and a microphone 7042. The graphics processing unit 7041 processes image data of a static picture or a video obtained by an image capturing apparatus (for example, a camera) in a video capturing mode or an image capturing mode. A processed image frame can be displayed on the display unit 706. The image frame processed by the graphics processing unit 7041 can be stored in the memory 709 (or another storage medium) or sent by the radio frequency unit 701 or the network module 702. The microphone 7042 can receive sound, and can process such sound into audio data. The processed audio data can be converted, in a telephone calling mode, into a format that can be sent by the radio frequency unit 701 to a mobile communications base station for output.

The terminal 700 further includes at least one sensor 705, such as a light sensor, a motion sensor, and other sensors. Specifically, the light sensor includes an ambient light sensor and a proximity sensor, where the ambient light sensor can adjust brightness of the display panel 7061 according to brightness of ambient light, and the proximity sensor can turn off the display panel 7061 and/or backlight when the terminal 700 moves towards the ear. As a type of motion sensor, an accelerometer sensor can detect accelerations in all directions (generally three axes), and can detect the magnitude and direction of gravity when it is still. The accelerometer sensor may be configured to identify a terminal posture (for example, switching between a landscape mode and a portrait mode, related games, and magnetometer posture calibration), perform vibration identification-related functions (for example, a pedometer and a knock), and the like. The sensor 705 may further include a fingerprint sensor, a pressure sensor, an iris sensor, a molecular sensor, a gyroscope, a barometer, a hygrometer, a thermometer, an infrared sensor, and the like. Details are not described herein again.

The display unit 706 is configured to display information entered by the user or information provided for the user. The display unit 706 may include a display panel 7061, and the display panel 7061 may be configured in a form of a liquid crystal display (LCD), an organic light-emitting diode (OLED), or the like.

The user input unit 707 may be configured to receive input numeric or character information, and generate key signal inputs related to user settings and function control of the terminal. Specifically, the user input unit 707 includes a touch panel 7071 and another input device 7072. The touch panel 7071, also referred to as a touch screen, may collect a touch operation performed by the user on or near the touch panel 7071 (for example, an operation performed by the user on or near the touch panel 7071 with any appropriate object or accessory such as a finger and a stylus). The touch panel 7071 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 710, receives a command sent by the processor 710, and executes the command. In addition, the touch panel 7071 may be implemented in various types such as resistive, capacitive, infrared, and surface acoustic wave. In addition to the touch panel 7071, the user input unit 707 may further include the another input device 7072. Specifically, the another input device 7072 may include but is not limited to a physical keyboard, function keys (such as a volume control key and a switch key), a trackball, a mouse, and a joystick. Details are not described herein.

Further, the touch panel 7071 may cover the display panel 7061. When detecting a touch operation on or near the touch panel 7071, the touch panel 7071 transmits the touch operation to the processor 710 to determine a type of a touch event. Then the processor 710 provides corresponding visual output on the display panel 7061 based on the type of the touch event. Although in FIG. 7, the touch panel 7071 and the display panel 7061 are two independent components for implementing input and output functions of the terminal, in some embodiments, the touch panel 7071 and the display panel 7061 may be integrated to implement the input and output functions of the terminal. Details are not limited herein.

The interface unit 708 is an interface connecting an external apparatus to the user equipment 700. For example, the external apparatus may include a wired or wireless headset port, an external power supply (or a battery charger) port, a wired or wireless data port, a memory card port, a port for connecting an apparatus having an identification module, an audio input/output (I/O) port, a video I/O port, a headset port, and the like. The interface unit 708 may be configured to receive an input (for example, data information and power) from an external apparatus and transmit the received input to one or more elements within the terminal 700, or may be configured to transmit data between the terminal 700 and the external apparatus.

The memory 709 may be configured to store software programs and various data. The memory 709 may mainly include a program storage area and a data storage area. The program storage area may store an operating system, an application program required by at least one function (such as a sound playback function and an image playback function), and the like. The data storage area may store data (such as audio data and a phone book) created based on use of the mobile phone, and the like. In addition, the memory 709 may include a high-speed random access memory or a nonvolatile memory, for example, at least one disk storage device, a flash memory, or another volatile solid-state storage device.

The processor 710 is a control center of the terminal. The processor 810 uses various interfaces and lines to connect the various parts of the entire terminal, and performs various functions of the terminal and processes data by running or executing software programs and/or modules stored in the memory 709 and invoking data stored in the memory 709, to monitor the terminal as a whole. The processor 710 may include one or more processing units. Optionally, the processor 710 may integrate an application processor and a modem processor. The application processor mainly deals with an operating system, a user interface, and an application program. The modem processor mainly deals with wireless communication. It may be understood that the modem processor may not be integrated into the processor 710.

The terminal 700 may further include a power supply 711 (for example, a battery) that supplies power to various components. Optionally, the power supply 711 may be logically connected to the processor 710 through a power supply management system, to perform functions of managing charging, discharging, and power consumption through the power supply management system.

In addition, the terminal 700 includes some function modules not shown, and details are not described herein.

Optionally, an embodiment of the present disclosure further provides a terminal, including a processor 710, a memory 709, and a computer program stored in the memory 709 and executable on the processor 710. When the computer program is executed by the processor 710, each process of the foregoing embodiments of the power control method can be implemented, and same technical effect can be achieved. To avoid repetition, details are not described herein again.

Figure 8:
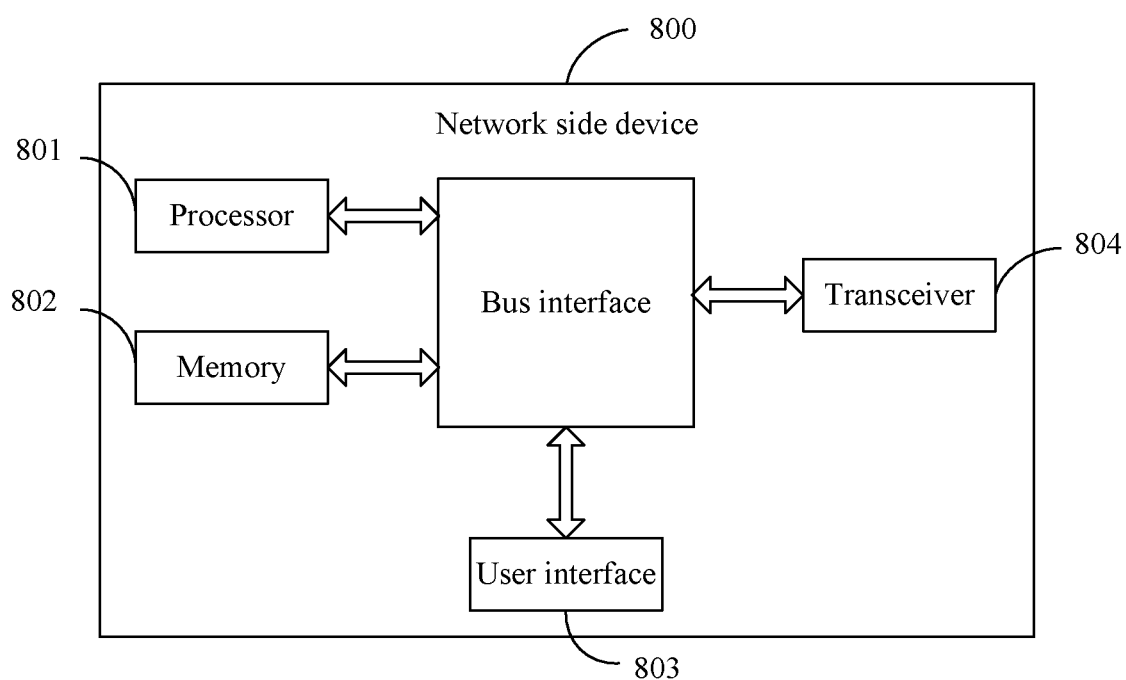
FIG. 8 is a second structural diagram of a network side device according to an embodiment of the present disclosure.

Referring to FIG. 8, FIG. 8 is a second structural diagram of a network side device according to an embodiment of the present disclosure. As shown in FIG. 8, the network side device 800 includes a processor 801, a memory 802, a user interface 803, a transceiver 804, and a bus interface.

In this embodiment of the present disclosure, the network side device 800 further includes: a computer program stored in the memory 802 and executable on the processor 801. The computer program, when executed by the processor 801, implements the following step:

transmitting a power control parameter to a terminal, where the power control parameter is used to control retransmission power of a data section in message 1 of a random access procedure.

Optionally, the power control parameter includes at least one of a power ramping step and a power adjustment value.

Optionally, the power control parameter includes the power adjustment value; and the sending a power control parameter to a terminal includes:

the following step is specifically implemented when the computer program is executed by the processor 801:

sending message 2 to the terminal, where the message 2 carries a TPC command that includes the power adjustment value.

In FIG. 8, a bus architecture may include any quantity of interconnected buses and bridges, which are specifically connected together by one or more processors represented by the processor 801 and various circuits of a memory represented by the memory 802. The bus architecture may further connect together various other circuits of a peripheral device, a voltage stabilizer, a power management circuit, and the like, which are known in this art and will not be further described herein. The bus interface provides an interface. The transmitter-receiver 804 may include a plurality of elements, namely a transmitter and a receiver, providing units in communication with various other devices on the transmission medium. Aiming at different user equipment, the user interface 803 may further be an interface in external and internal connection with required equipment. The equipment connected includes, but is not limited to a key pad, a display, a loudspeaker, a microphone and a joystick.

The processor 801 is responsible for management of a bus architecture and general processing. The memory 802 may store data used when the processor 801 performs an operation.

The network side device 800 can implement each process implemented by the network side device in the foregoing method embodiments. To avoid repetition, details are not described herein again.

An embodiment of the present disclosure further provides a computer readable storage medium. The computer readable storage medium stores a computer program, the computer program, when executed by a processor, implements the processes of the foregoing embodiments of the power control method, and same technical effects can be achieved. To avoid repetition, details are not described herein again. The computer-readable storage medium is, for example, a read-only memory (ROM), a random access memory (RAM), a magnetic disk, or an optical disc.

It should be noted that in this specification, the terms "comprise", "include" and any other variants thereof are intended to cover non-exclusive inclusion, so that a process, a method, an article, or an apparatus that includes a series of elements not only includes these very elements, but may also include other elements not expressly listed, or also include elements inherent to this process, method, article, or apparatus. Without being subject to further limitations, an element defined by a phrase "including a . . ." does not exclude presence of other identical elements in the process, method, article, or apparatus that includes the very element.

By means of the foregoing description of the embodiments, a person skilled in the art may clearly understand that the method in the foregoing embodiments may be implemented by software with a necessary general hardware platform. Certainly, the method in the foregoing embodiments may also be implemented by hardware. Consistent with the disclosed embodiments, the technical solutions of the present disclosure essentially, or the part contributing to the related technologies may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of the present disclosure. The hardware embodiments of the present disclosure may include, but are not limited to, circuits, programmable logic devices, application-specific integrated circuits, processors, programmable processors, and the like.

The embodiments of the present disclosure are described above with reference to the accompanying drawings, but the present disclosure is not limited to the foregoing specific implementations. The foregoing specific implementations are merely schematic instead of restrictive implementations. Under enlightenment of the present disclosure, a person of ordinary skill in the art may make many forms without departing from the aims of the present disclosure and the protection scope of claims, all of which fall within the protection of the present disclosure.

What is claimed is:

1. A method of power control, performed by a terminal, the method comprising:

transmitting a message 1 of a 2-step random access channel (RACH) procedure to a network side device;

receiving an instruction from the network side device indicating that the network side device fails to obtain a data section of the message 1;

obtaining a power control parameter from the network side device;

retransmitting the message 1 to the network side device in response to the instruction; and controlling retransmission power of the data section of the retransmitted message 1 based on the power control parameter, wherein the retransmitted message 1 comprises a non-data section comprising control information for assisting the retransmission of the data section, wherein the power control parameter comprises a power ramping step, and when the retransmission power of the data section of the retransmitted message 1 is less than a specified maximum retransmission power, the retransmission power of the data section of the retransmitted message 1 is positively correlated with a retransmission sequence number of the data section in the message 1.

2. The method according to claim 1, wherein the power control parameter further comprises a power adjustment value.

3. The method according to claim 2, wherein obtaining the power control parameter comprises:
receiving a message 2 sent by the network side device, wherein the message 2 comprises a transmit power control (TPC) command that indicates the power adjustment value.

4. The method according to claim 2, wherein:
controlling the retransmission power of the data section of the retransmitted message 1 based on the power control parameter comprises:
when the power ramping step and the power adjustment value are obtained, controlling the retransmission power of the data section of the retransmitted message 1 based on the power adjustment value;
when the power ramping step and the power adjustment value are obtained, controlling the retransmission power of the data section of the retransmitted message 1 based on the power ramping step; or
when the power ramping step and the power adjustment value are obtained, controlling the retransmission power of the data section of the retransmitted message 1 based on the power adjustment value and the power ramping step.

5. The method according to claim 1, wherein controlling the retransmission power of the data section of the retransmitted message 1 based on the power control parameter comprises:
determining an amount of power ramping, wherein the amount of power ramping is equal to a product of N and the power ramping step, and N is a sum of an actual number of retransmissions of the data section in the message 1 and 1; and
controlling the retransmission power of the data section of the retransmitted message 1 based on the amount of power ramping.

6. A method of power control, performed by a network side device, the method comprising:
after failing to obtain a data section of a message 1 of a 2-step random access channel (RACH) procedure from a terminal, instructing the terminal to retransmit the message 1 to the network side device; and
sending a power control parameter to the terminal, wherein the power control parameter is used to control retransmission power of the data section of the message 1, wherein the message 1 comprises a non-data section comprising control information for assisting the retransmission of the data section,
wherein the power control parameter comprises a power ramping step, and when the retransmission power of the data section of the retransmitted message 1 is less than a specified maximum retransmission power, the retransmission power of the data section of the retransmitted message 1 is positively correlated with a retransmission sequence number of the data section in the message 1.

7. The method according to claim 6, wherein the power control parameter further comprises a power adjustment value.

8. The method according to claim 7, wherein sending the power control parameter to the terminal comprises:
sending a message 2 to the terminal, wherein the message 2 carries a TPC command that comprises the power adjustment value.

9. A terminal, comprising a processor, a memory, and a computer program stored in the memory and executable on the processor, wherein the computer program, when executed by the processor, implements operations comprising:
transmitting a message 1 of a 2-step random access channel (RACH) procedure to a network side device;
receiving an instruction from the network side device indicating that the network side device fails to obtain a data section of the message 1;
obtaining a power control parameter from the network side device;
retransmitting the message 1 to the network side device in response to the instruction; and
controlling retransmission power of the data section of the retransmitted message 1 based on the power control parameter, wherein the retransmitted message 1 comprises a non-data section comprising control information for assisting the retransmission of the data section,
wherein the power control parameter comprises a power ramping step, and when the retransmission power of the data section of the retransmitted message 1 is less than a specified maximum retransmission power, the retransmission power of the data section of the retransmitted message 1 is positively correlated with a retransmission sequence number of the data section in the message 1.

10. The terminal according to claim 9, wherein the power control parameter further comprises a power adjustment value.

11. The terminal according to claim 10, wherein obtaining the power control parameter comprises:
receiving a message 2 sent by the network side device, wherein the message 2 comprises a transmit power control (TPC) command that indicates the power adjustment value.

12. The terminal according to claim 10, wherein:
controlling the retransmission power of the data section of the retransmitted message 1 based on the power control parameter comprises:
when the power ramping step and the power adjustment value are obtained, controlling the retransmission power of the data section of the retransmitted message 1 based on the power adjustment value;
when the power ramping step and the power adjustment value are obtained, controlling the retransmission power of the data section of the retransmitted message 1 based on the power ramping step; or
when the power ramping step and the power adjustment value are obtained, controlling the retransmission power of the data section of the retransmitted message 1 based on the power adjustment value and the power ramping step.

13. The terminal according to claim 9, wherein controlling the retransmission power of the data section of the retransmitted message 1 based on the power control parameter comprises:
determining an amount of power ramping, wherein the amount of power ramping is equal to a product of N and the power ramping step, and N is a sum of an actual number of retransmissions of the data section in the message 1 and 1; and controlling the retransmission power of the data section of the retransmitted message 1 based on the amount of power ramping.

\* \* \* \* \*